United States Patent Office 3,374,686
Patented Mar. 26, 1968

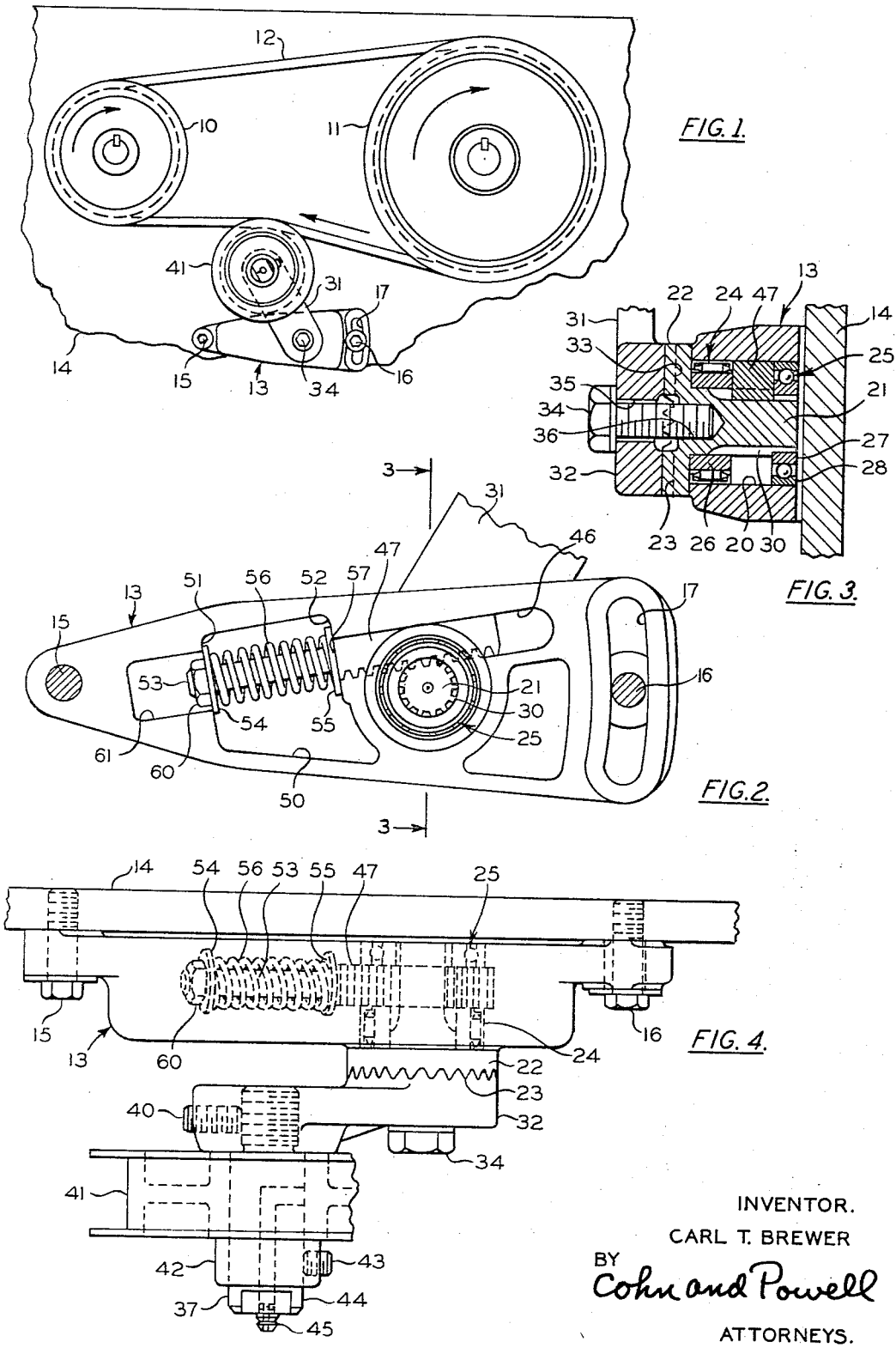

3,374,686
DRIVE-TENSIONING APPARATUS
Carl T. Brewer, % Brewer Machine & Gear Co.,
1441 N. 2nd St., St. Louis, Mo. 63102
Filed Dec. 1, 1965, Ser. No. 510,834
8 Claims (Cl. 74—242.11)

ABSTRACT OF THE DISCLOSURE

The drive tensioner includes a base having a shaft mounted to it, the shaft being connected external of the base to a transverse arm. The transverse arm is provided with a pulley which engages a belt drive. Internally of the base, the shaft is connected to a pinion which operates a double-acting spring-loaded rack member. Angular rotation of the arm, in either direction from a neutral position, increases the compression in the spring-loaded rack mechanism. The tensioner is thus reversible.

---

This invention relates generally to improvements in a drive-tensioning apparatus, and more particularly to an improved, automatically adjustable, resiliently-loaded drive tensioner.

The present invention constitutes improvements in the drive-tensioning apparatus of the general type disclosed in applicant's U.S. Patent No. 3,071,980 issued Jan. 8, 1963.

There is a constant search to improve efficiency in transmitting power between a prime mover and a driven machine through flexible belts and chains because loss of such power is inevitable. It has been found that a principal cause of this power loss is the result of operating the belts and chains in a slack condition, and consequently, efforts have been made to produce means of insuring that such slack is reduced to a minimum. However excessive tightness in the flexible belts and chains results in undue wear and deterioration. It is a major objective of the present invention to provide a tensioning device that may be readily adjusted and which will maintain an optimum tension in the flexible drive element at all times.

An important objective is achieved by the provision of an arm connected to and rotatable with a shaft mounted to a base of the drive tensioner, the arm having a member engaging the flexible drive element, and by the provision of resilient means connected to the shaft through a gear means which tends to urge the arm to a static position when the arm is displaced angularly from the static position upon engagement of the arm member with the drive element, and thereby tends to tighten the drive element.

Another important object is afforded by constructing the gear means with a pinion on and rotatable with the shaft, and a rack reciprocatively mounted on the base and operatively engaging the pinion, and by connecting the resilient means to the rack so that the resilient means tends to move the rack in a direction to swing the arm, through the pinion and shaft, toward its static position and hence urge the arm member against the flexible drive element.

Yet another important objective is attained by the operative connection of the gear means with the arm shaft in which the shaft is rotatively mounted within a socket formed in the base, the shaft pinion is located in the socket, and the rack extends into the socket and engages the pinion.

An important objective is realized by the provision of a pair of spaced bearings in the base socket which rotatively mount the shaft, the rack being reciprocatively mounted in an elongate groove formed in the base and communicating with the base socket, and being disposed and retained between the pair of spaced bearings while operatively engaging the pinion.

Another important object is provided by a stop slidably mounted on the rack which engages a base abutment, and by a resilient means operatively connected to the rack and engaging the stop so that the stop is urged against the base abutment, the stop being slidably moved along the rack under resilient loading when the rack is moved in one longitudinal direction upon angular displacement of the arm from its static position, the resilient means tending to urge the rack in the opposite direction to swing the arm toward the static position.

Still another important object is achieved by the provision of a pair of spaced, oppositely related abutments on the base, the stop means slidably mounted on the rack being located between the spaced abutments. The resilient means engages the stop means and is operatively connected to the rack so that the stop means is urged selectively against one or the other of the abutments and is slidably moved along the rack under resilient loading when the rack is moved respectively in one or the other longitudinal direction, the resilient means tending to urge the rack in the respective opposite direction to return the arm to its static position, and thereby maintaining a resilient loading of the arm member against the drive element.

An important object is afforded by the provision of a pair of stops movably mounted on the rack between the spaced abutments, and by the location of the resilient means between the spaced stops so that the resilient means tends to urge the stops in opposite directions against the spaced abutments on the base. Rack shoulders interconnect the rack with the stops to carry selectively one or the other of the stops away from its associated abutment when the rack is moved respectively in one or the other longitudinal direction, the resilient means being compressed between the stops and tending to urge the rack in respective opposite directions.

Another important objective is attained in that one of the rack shoulders engaging one of the rack stops is adjustably mounted in order to adjust the longitudinal spacing between the stops so as to assure seating of the stops against the base abutments and assure engagement of the rack shoulders with the stops in the static position of the arm.

An important object is to provide a drive-tensioning apparatus that is simple and durable in construction, economical to manufacture, efficient in operation, and which can be readily adjusted by any one to tension a flexible drive element such as a chain or belt in a power transmission.

The foregoing and numerous other objects and advantages of the invention will more clearly appear from the following detailed description of a preferred embodiment, particularly when considered in connection with the accompanying drawing, in which:

FIG. 1 is a side elevational view of the drive-tensioning apparatus assembled to a machine frame and operatively engaging a flexible drive element in a power transmission;

FIG. 2 is an enlarged, fragmentary rear elevational view of the drive tensioner;

FIG. 3 is a fragmentary cross-sectional view taken along line 3—3 of FIG. 2, and FIG. 4 is a top plan view of the drive tensioner attached to the machine frame.

Referring now by characters of reference to the drawing, and first to FIG. 1, it will be understood that the drive-tensioning apparatus is utilized with a power transmission including a pair of pulleys 10 and 11 operatively interconnected by a continuous belt 12 constituting a flexible drive element. Of course, this power transmission of pulleys 10 and 11 and belt 12 is merely illustrative. The drive-tensioning apparatus can be used with equal facility with other equivalent power transmissions such as a pair of sprockets interconnected by a flexible chain.

The drive-tensioning apparatus includes a substantially, triangularly-shaped base 13 attached to a machine frame 14 by a pair of bolts 15 and 16. One end of base 13, specifically the apex of the triangularly-shaped base 13, is secured by bolt 15 that acts as a pivot pin about which the base 13 can swing when the bolt 15 is loosened. To guide base 13 in this pivotal movement, the other end of base 13 is provided with an arcuate slot 17 formed by a radius extending from the pivot axis of bolt 15. As is best seen in FIG. 2, the bolt 16 is received in and extends through the slot 17.

When the bolt 16 is loosened, the base 13 can be shifted in a direction toward or away from the flexible belt 12 within a range determined by the relative movement of bolt 16 in slot 17. After the base 13 is adjusted to the desired position, the bolts 15 and 16 are tightened in order to clamp the base 13 securely to the machine frame 14.

Rotatively mounted in a circular socket 20 formed through the base 13, is a pivot shaft 21. When the tensioner is mounted on the machine frame 14, the rotative axis of pivot shaft 21 extends substantially parallel to and in the same direction as the rotative axes of pouleys 10 and 11. The shaft 21 includes a circular flange 22 constituting a pad located outwardly of the socket 20 on the front face of base 13. A plurality of alternately formed, axially extending, lands and grooves 23 are formed on the outermost face of shaft flange 22. The purpose and function of the latter lands and grooves 23 will become apparent on more detailed description of parts.

The shaft 21 is rotatively mounted in the socket 20 by a pair of spaced bearings 24 and 25. The bearing 24 is disposed at the front end of the socket 20 immediately behind the shaft flange 22, such front bearing 24 being preferably of the roller type having an inner race 26. The other bearing 25 is located at the rear of the socket 20 and is preferably of the ball-type complete with inner and outer races 27 and 28. The inner race 26 of front bearing 24 and the inner race 27 of rear bearing 25 are pressed on the shaft 21 so as to rotate therewith.

A pinion 30 on and rotatable with the shaft 21 is located in the socket 20 and extends across the space between bearings 24 and 25. Specifically, the pinion 30 is formed by a plurality of teeth formed on and extending about the periphery of shaft 21.

An arm 31 is angularly related to the pivot shaft 21. The arm 31 includes a hub 32, the innermost face of which is provided with a coacting formation of alternately formed, axially extending lands and grooves 33 that interfit the lands and grooves 23 formed on the shaft flange 22. The arm hub 32 is fixed to the shaft flange 22 by a center bolt 34, the bolt 34 extending through an untapped center hole 35 formed in the hub 32 and threadedly engaging a tapped center hole 36 in the circular shaft flange 22.

It is apparent that when bolt 34 is loosened sufficiently, the arm 31 can be rotated a full 360 degrees. After the arm is disposed in a desired angular position, for the purposes and advantages later discussed in detail, the bolt 34 is tightened to clamp the arm hub 32 to the shaft flange 22, the cooperating lands and grooves 23 and 33 interfitting when the bolt 34 is tightened to provide an effective clutch that holds the arm 31 in the predetermined angular position.

Threadedly attached to the outermost end of arm 31 is a stub shaft 37, the axis of which is disposed parallel to and in the same direction as the pivot shaft 21. A set screw 40 extends through arm 31 to engage the threaded portion of shaft 37 in order to preclude unintentional disconnection. Rotatively mounted on stub shaft 37 is an idler pulley 41 having a grooved periphery adapted to receive and engage the flexible drive belt 12. One side of idler pulley 41 abuts the arm 31. The opposite side of idler pulley 41 abuts a retaining ring 42 slipped over the end of stub shaft 37 and fixed in place by a set screw 43.

As mentioned previously, if the flexible drive element 12 consisted of a chain, the idler member 41 in the drive-tensioning apparatus would then consist of a sprocket instead of a pulley, all as is well understood.

An oil passage 44 is formed longitudinally along the axis of stub shaft 37 and includes a branch portion that communicates with the bearing surfaces between idler pulley 41 and stub shaft 37. Fastened to the front of stub shaft 37 and closing the front end of oil passage 44 is an oil fitting 45. Of course, lubrication of these bearing surfaces is required so that idler pulley 41 rotates freely under all conditions.

Formed in the base 13 is an elongated groove 46 that communicates with the side of base socket 20. Slidably and reciprocatively mounted in the elongate groove 46, is a rack 47, the rack 47 being located and retained between the front and rear bearings 24 and 25 and operatively meshing with the shaft pinion 30. One end of the base groove 46 opens into and communicates with an internal pocket 50 formed in the base 13. For reasons which will later appear, the base 13 provides spaced, oppositely facing abutments 51 and 52 in the pocket 50.

The rack 47 includes a shank portion 53 that extends into the pocket 50 and between the spaced abutments 51 and 52. Slidably mounted on the shank portion 53 of rack 47 are a pair of spaced washers 54 and 55, constituting stops, the washers 54 and 55 being located between and engaging respectively the base abutments 51 and 52. A compression spring 56 constituting a resilient means is carried by the shank portion 53 and is located between the washers 54 and 55, the spring 56 tending to urge the washers 54 and 55 apart and against the base abutments 51 and 52 respectively to maintain the arm 31, through the rack 47 and pinion 30 connection, in a static position. The reduced shank portion 53 provides a rack shoulder 57 engaging one side of washer 55 to preclude slidable axial movement of the washer 55 along the shank portion 53 in one direction. A nut 60 constituting another rack shoulder is threadedly fastened to the reduced shank portion 53 and engages the other washer 54 to limit its outward axial movement in the other direction.

In its static position, the spring 56 is under initial compression so that the washers 54 and 55 are seated under light pressure against the coacting base abutments 51 and 52 respectively. The nut 60 is threadedly adjusted to cause this structural relationship and to assure that the nut 60 and rack shoulder 57 engage the washers 54 and 55 respectively.

When the arm 31 is offset to either side from its static position under pressure of the drive belt 12 on the idler pulley 41, as for example offset in a counter-clockwise direction in FIG. 1 and clockwise direction in FIG. 2, the pinion 30 meshing with the rack 47 causes longitudinal movement of the rack 47 in one direction (toward the right as viewed in FIG. 2) so that the nut 60 constituting a rack shoulder moves the washer 54 away from the base abutment 51, thereby compressing the spring 56 and urging the washer 55 against the associated base abutment 52, the washer 55 sliding relatively along the reduced shank portion 53. The compressive loading of spring 56 tends to urge the rack 47 in the opposite longitudinal direction, i.e., toward the left in FIG. 2, thereby tending to swing the arm 31 back to its static position through the interconnection of the rack 47 and pinion 30.

A similar operation occurs when the arm 31 is offset to the other side of its static position in which the rack 47 is moved longitudinally in the opposite direction so that the rack shoulder 57 moves the washer 55 away from its base abutment 52. Again, the compressive action of the spring 56 tends to return the arm 31 to its static position.

It is thought that the operation and functional advantages of the drive-tensioning apparatus have become fully apparent from the foregoing detailed description of parts, but for completeness of disclosure, the assembly and usage of the apparatus will be briefly described. It will be assumed that it is desirable to have the idler pulley 41 engage the belt 12 along the outside of the lower belt span.

It is desirable to preassemble the internal mechanism with the base 13. The spring assembly, consisting of washers 54 and 55, together with the compression spring 56 is fitted on the reduced shank portion 53 of rack 47, and the nut 60 is threadedly connected to the reduced shank portion 53 to engage the washer 54 and compress the spring 56 sufficiently to allow the rack 47 and the spring assembly to be pressed into location within the base 13. The rack 47 is slidably inserted into the base groove 46 while the spring assembly is inserted into the base pocket 50 with the washers 54 and 55 seating on the base abutments 51 and 52 respectively. The end of the shank portion 53 and the nut 60 are received in an offset pocket recess 61 provided in the base 13.

The front and rear bearings 24 and 25 are driven into location at opposite ends of the circular socket 20 on opposite sides of the rack 47. The front and rear bearings 24 and 25 constrain the rack 47 to longitudinal movement within the groove 46 upon reciprocation.

The pivot shaft 21, including the inner race 26 of front bearing 24, is now inserted in the socket 20, the shaft 21 extending between the bearings 24 and 25 and the pinion 30 meshing with the rack 47. The inner end of shaft 21 has a relatively tight fit with the inner race 27 of rear bearing 25.

The base 13, including the preassembled internal mechanism, is secured to the machine frame 14 by bolts 15 and 16. The arm 31 is secured to the shaft flange 22 in a predetermined static, angular position by passing bolt 34 through untapped hole 35 in the hub 32 and into the threaded center hole 36 in the shaft flange 22. The interfitting lands and grooves 23 and 33 between the arm hub 32 and the shaft flange 22 preclude rotation of arm 31 from the desired static, angular position except as it is permitted by the operation of the rack and pinion connection against the loading of spring 56.

From FIG. 2, it is seen that clockwise rotation of arm 31 from its static position, because of the engagement of shaft pinion 30 with rack 47, induces longitudinal movement of rack 47 in one direction toward the closed end of base groove 46 against the compressive action of spring 56. The seating of washer 55 on the base abutment 52 under pressure causes the spring 56 to be compressed by the continuing pressure exerted on the spring 56 by movement of the washer 54 by nut 60 toward the washer 55. Release of the torque applied to the arm 31 allows the arm 31 to return to its static position.

Conversely, counter-clockwise rotation of arm 31 (FIG. 2) induces movement of the rack 47 in a longitudinal direction away from the closed end of base groove 46. Seating of the washer 54 against the base abutment 51 causes the spring 56 to be compressed by the continuing pressure exerted on the spring 56 by the movement of washer 55 and rack shoulder 57 toward the washer 54. It will be understood that the rack shoulder 57 performs the same function as the nut 60 in the corresponding operation previously described. Again, release of the torque applied to arm 31 allows the arm 31 to return to its static position.

Loosening the center bolt 34, so that the interfitting lands and grooves 23 and 33 clear each other, enables the arm 31 to be rotated to a predetermined angular position. The bolt 34 is then tightened so that when the arm 31 is rotated to one side of the static position against the loading of spring 56, and when the idler pulley 41 is brought into engagement with the lower span of belt 12, the slack in belt 12 is taken up against the loading of the spring 56. A subsequent slackening of the belt 12 because of wear or other reasons, will result in a partial release of the compression spring 56, thereby taking up this additional slack. It will be understood that belt 12 is maintained in a constantly taut condition at all times while compression exists in spring 56.

Precise adjustment of the belt tension is rendered possible by utilizing the fine adjustment capability of the tensioner. By loosening bolts 15 and 16, and by rotating the base 13 about the pivot axis defined by bolt 15, as permitted by the relative movement of bolt 16 in arcuate slot 17, the desired belt tension is achieved. The bolts 15 and 16 are then tightened to clamp the base 13 in adjusted position on the machine frame 14.

It is advantageous to have the arm 31 of the tensioner orientated relative to the belt 12 so that pressure exerted on the arm 31 by the belt 12 tends to move the idler pulley 41 downwardly away from the belt 12 rather than upwardly and into the belt 12. This preferred arrangement is illustrated in FIG. 1. For example, if the idler pulley 41 freezes on its stub shaft 37, the idler pulley 41 will not be forced upwardly into the belt 12 (by clockwise rotation of arm 31) which could result in a critical increase in tension of the belt 12 and cause the belt 12 to break.

If it is desired to reverse the direction of motion of the belt 12, or if for any other reason it is required to reorientate the arm 31 in order to achieve this functional advantage, the arm 31 is re-orientated by loosening bolt 34 and rotating the arm 31 in a counter-clockwise direction until a new predetermined static position is attained. The bolt 34 is then tightened to clamp the arm 31 in this new static position. When the idler pulley 41 is moved into contact with the lower span of belt 12, the arm 31 is offset to one side from this new static position against the loading of spring 56.

There is no necessity to remove any internal mechanism to achieve orientation of the arm 31 as described because of the dual-action of the spring assembly that enables the arm 31 to be offset to either side of a predetermined static position against the resilient loading of spring 56.

The drive-tensioning apparatus can be conveniently utilized in numerous positions other than the one illustrated in FIG. 1. Obviously, the apparatus can be placed inside of belt 12 so that the idler pulley 41 engages the inner side of the lower belt span. Similarly, the apparatus can be conveniently placed so that the idler pulley 41 engages either side of the upper belt span. The apparatus, in all cases, operates in the manner described to take up slack in belt 12.

Although the invention has been described by making detailed reference to a single preferred embodiment, such detail is to be understood in an instructive rather than in any restrictive sense, many variants being possible within the scope of the claims hereunto appended.

I claim as my invention:

1. An adjustable, resiliently-loaded drive tensioner for a flexible drive element, comprising:
    (a) a base,
    (b) a shaft rotatively mounted to the base,
    (c) an arm connected to and rotatable with the shaft, the arm extending at an angle to the shaft axis,
    (d) a member mounted to the arm and engaging the drive element,
    (e) gear means connected to the shaft,
    (f) resilient means connected operatively to the gear means and tending to urge the arm to a static position when the arm is angularly displaced from the static position upon engagement of the member with the drive element, and thereby tending to tighten the drive element,
    (g) the gear means including a pinion on and rotatable with the shaft,
    (h) a rack reciprocatively mounted in the base and operatively engaging the pinion, and
    (i) the resilient means being operatively connected to the rack and tending to move the rack longitudinally in one direction or the other equally so as to swing the arm through the pinion and shaft, toward its static position when the arm is angularly displaced equally on either side from the static condition.

2. An adjustable, resiliently-loaded drive tensioner for a flexible drive element, comprising:
(a) a base,
(b) a shaft rotatively mounted to the base,
(c) an arm connected to and rotatable with the shaft, the arm extending at an angle to the shaft axis,
(d) a member mounted to the arm and engaging the drive element,
(e) gear means connected to the shaft,
(f) resilient means connected operatively to the gear means and tending to urge the arm to a static position when the arm is angularly displaced from the static position upon engagement of the member with the drive element, and thereby tending to tighten the drive element,
(g) the base including a socket and an elongate groove communicating with the socket,
(h) the shaft being rotatively mounted in the socket,
(i) the gear means including a pinion on and rotatable with the shaft, the pinion being located in the socket,
(j) a rack reciprocatively mounted in the groove and operatively engaging the pinion,
(k) means within the socket retaining the rack within the groove, and
(l) the resilient means being operatively connected to the rack and tending to move the rack longitudinally in one direction or the other equally so as to swing the arm, through the pinion and shaft, toward its static position when the arm is angularly displaced equally on either side from the static position, and thereby urge the member against the drive element.

3. A drive tensioner as defined in claim 2, in which:
(m) a pair of spaced bearings are disposed in the socket and rotatively mounted to the shaft, and
(n) the rack is disposed between the pair of spaced bearings and retained in the direction of the axis of rotation of the shaft.

4. An adjustable, resiliently-loaded drive tensioner for a flexible drive element, comprising:
(a) a base,
(b) a shaft rotatively mounted to the base,
(c) an arm connected to and rotatable with the shaft, the arm extending at an angle to the shaft axis,
(d) a member mounted to the arm and engaging the drive element,
(e) gear means connected to the shaft,
(f) resilient means connected operatively to the gear means and tending to urge the arm to a static position when the arm is angularly displaced from the static position upon engagement of the member with the drive element, and thereby tending to tighten the drive element,
(g) the base including a pair of spaced abutments, oppositely disposed in fixed relation,
(h) the gear means including a pinion on and rotatable with the shaft,
(i) a rack reciprocatively mounted on the base and operatively engaging the pinion,
(j) stop means slidably mounted on the rack between the spaced abutments, and
(k) the resilient means engaging the stop means and operatively connected to the rack so that the stop means is urged selectively against one or the other of the abutments and slidably moved along the rack under resilient loading when the rack is moved respectively in one or the other longitudinal direction, the resilient means tending to urge the rack in the respective opposite direction so as to swing the arm, through the pinion and shaft, toward its static position when the arm is angularly displaced on either side from the static position, whereby to urge the member against the drive element.

5. An adjustable, resiliently-loaded drive tensioner for a flexible drive element, comprising:
(a) a base,
(b) a shaft rotatively mounted to the base,
(c) an arm connected to and rotatable with the shaft, the arm extending at an angle to the shaft axis,
(d) a member mounted to the arm and engaging the drive element,
(e) gear means connected to the shaft,
(f) resilient means connected operatively to the gear means and tending to urge the arm to a static position when the arm is angularly displaced from the static position upon engagement of the member with the drive element, and thereby tending to tighten the drive element,
(g) the base including a pair of spaced abutments, oppositely disposed in fixed relation,
(h) the gear means including a pinion on and rotatable with the shaft,
(i) a rack reciprocatively mounted on the base and operatively engaging the pinion, the rack extending between the spaced abutments,
(j) a pair of stops movably mounted on the rack between the spaced abutments,
(k) the resilient means being located between and engaging the spaced stops, the resilient means tending to urge the stops in opposite directions against the spaced abutments, and
(l) means interconnecting the rack with the stops to carry selectively one or the other of the stops away from its associated abutment when the rack is moved respectively in one or the other longitudinal direction as the arm is angularly displaced on either side of its static position, the resilient means being compressed between the stops and tending to urge the rack in the respective opposite direction and swing the arm, through the pinion and shaft, toward the static position, whereby to urge the member against the drive element.

6. A drive tensioner as defined in claim 5, in which:
(m) the means interconnecting the rack with the stops include a pair of spaced shoulders, one shoulder engaging one stop to move the said one stop away from its associated abutment upon longitudinal movement of the rack in one direction, the other shoulder engaging the other stop to move the said other stop away from its associated abutment upon longitudinal movement of the rack in the opposite direction, and
(n) one of the shoulders is adjustably connected to the rack to adjust the longitudinal spacing between the stops so as to assure seating of the stops against the abutments and to assure engagement of the shoulders with the stops in the static position of the arm.

7. An adjustable, resiliently-loaded drive tensioner for a flexible drive element, comprising:
(a) a base,
(b) a shaft rotatively mounted to the base,
(c) an arm connected to and rotatable with the shaft, the arm extending at an angle to the shaft axis,
(d) a member mounted to the arm and engaging the drive element,
(e) gear means connected to the shaft,
(f) resilient means connected operatively to the gear means and tending to urge the arm to a static position when the arm is angularly displaced from the static position upon engagement of the member with the drive element, and thereby tending to tighten the drive element,
(g) the base includes a socket and an abutment,
(h) means rotatively mount the shaft in the socket,
(i) the gear means include a pinion on and rotatable with the shaft, the pinion being located in the socket, (j) a rack reciprocatively mounted on the base and extending into the socket and operatively meshing with the pinion, (k) a stop slidably mounted on the rack and engaging the abutment, and (l) the resilient means engages the stop and is operatively connected to the rack so that the stop is urged against the abutment and slidably moved along the rack under resilient loading when the rack is moved in one longitudinal direction and the arm is angularly displaced from its static position, the resilent means tendng to urge the rack in the opposite longitudinal direction so as to swing the arm, through the pinion and shaft, toward its static position, whereby to urge the member against the drive element.

8. An adjustable, resiliently-loaded drive tensioner for a flexible drive element, comprising:
(a) a base,
(b) a shaft rotatively mounted to the base,
(c) an arm connected to and rotatable with the shaft, the arm extending at an angle to the shaft axis,
(d) a member mounted to the arm and engaging the drive element,
(e) gear means connected to the shaft,
(f) resilient means connected operatively to the gear means and tending to urge the arm to a static position when the arm is angularly displaced from the static position upon engagement of the member with the drive element, and thereby tending to tighten the drive element,
(g) the base includes a socket and an elongate groove communicating with the socket,
(h) a pair of spaced bearings located in the socket and rotatively mounting the shaft,
(i) the gear means include a pinion on and rotatable with the shaft, the pinion being located in the socket,
(j) a rack reciprocatively mounted in the groove and extending into the socket between the pair of spaced bearings to mesh operatively with the pinion,
(k) the shaft includes a pad outwardly of the socket,
(l) the arm includes a hub,
(m) means detachably interconnecting the arm hub to the shaft pad in a selected angular position displaced from either side from its static position upon engagement of the member with the drive element,
(n) the base includes a pair of spaced, oppositely related abutments,
(o) stop means slidably mounted on the rack between the spaced abutments, and
(p) the resilient means engages the stop and is operatively connected to the rack so that the stop means is urged selectively against one or the other of the abutments, and slidably moved along the rack under resilient loading when the rack is moved respectively in one or the other longitudinal direction upon displacement of the arm on either side of its static position, the resilient means tending to urge the rack in the respective opposite direction so as to swing the arm, through the pinion and shaft, toward its static position, whereby to urge the member against the drive element.

References Cited
UNITED STATES PATENTS

| | | | |
|---|---|---|---|
| 1,690,145 | 11/1928 | Vivarttas | 74—242.11 |
| 1,744,486 | 1/1930 | Mikesh | 74—242.1 |
| 2,074,078 | 3/1937 | Swift | 74—242.15 X |
| 3,004,443 | 10/1961 | Gerrans | 74—242.1 X |
| 3,071,980 | 1/1963 | Brewer | 74—242.1 |
| 3,266,047 | 8/1966 | Zabriskie | 74—242.15 X |

FRED C. MATTERN, JR., *Primary Examiner.*

J. C. WONG, *Assistant Examiner.*